United States Patent
Asao et al.

(10) Patent No.: US 10,144,447 B2
(45) Date of Patent: Dec. 4, 2018

(54) CONTROL UNIT AND ELECTRIC POWER STEERING DEVICE USING SAME, AND METHOD FOR MANUFACTURING CONTROL UNIT

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 18 days.

(21) Appl. No.: 15/319,971

(22) PCT Filed: Aug. 15, 2014

(86) PCT No.: PCT/JP2014/071490
§ 371 (c)(1),
(2) Date: Dec. 19, 2016

(87) PCT Pub. No.: WO2016/024358
PCT Pub. Date: Feb. 18, 2016

(65) Prior Publication Data
US 2017/0151976 A1   Jun. 1, 2017

(51) Int. Cl.
*B62D 5/04* (2006.01)
*H01R 27/02* (2006.01)
(Continued)

(52) U.S. Cl.
CPC .......... *B62D 5/0463* (2013.01); *H01R 27/02* (2013.01); *H02K 11/028* (2013.01); *H02K 11/33* (2016.01)

(58) Field of Classification Search
CPC ....... B62D 5/0463; H01R 27/02; H02K 11/33
See application file for complete search history.

(56) References Cited

U.S. PATENT DOCUMENTS

2012/0286630 A1\* 11/2012 Tomizawa ............. H02K 5/225
310/68 D
2014/0300304 A1\* 10/2014 Omae .................. H02K 11/024
318/400.24
(Continued)

FOREIGN PATENT DOCUMENTS

JP   11-168851 A   6/1999
JP   2012-143036 A   7/2012
(Continued)

OTHER PUBLICATIONS

International Search Report of PCT/JP2014/071490 dated Oct. 14, 2014 [PCT/ISA/210].
(Continued)

*Primary Examiner* — Muhammad S Islam
(74) *Attorney, Agent, or Firm* — Sughrue Mion, PLLC; Richard C. Turner

(57) ABSTRACT

A connector assembly body has: on an end surface on an opposite side to an output side of a motor; a large-current connector of a power supply system, with large-current connector being disposed in the same direction as the motor output shaft; a small-current connector of a signal system, with the small-current connector being disposed in the same direction as the motor output shaft; and a component mounting section including at least one of a capacitor and a coil, and the large-current connector, the small-current connector and the component mounting section are disposed separately in respective regions.

10 Claims, 8 Drawing Sheets

(51) Int. Cl.
H02K 11/33 (2016.01)
H02K 11/028 (2016.01)

(56) References Cited

U.S. PATENT DOCUMENTS

2014/0326530 A1* 11/2014 Asao .................... B62D 5/0406
180/443
2015/0171709 A1* 6/2015 Ito .......................... H02K 5/225
310/52

FOREIGN PATENT DOCUMENTS

| JP | 2013-207963 A | 10/2013 |
| JP | 2013-211938 A | 10/2013 |
| WO | 03/001647 A1 | 1/2003 |
| WO | 2013/132584 A1 | 3/2012 |
| WO | 2014/033833 A1 | 3/2014 |
| WO | 2014/054098 A | 4/2014 |

OTHER PUBLICATIONS

Communication dated Dec. 5, 2017 from the Japanese Patent Office in counterpart application No. 2016-542489.

* cited by examiner

CONTROL UNIT AND ELECTRIC POWER STEERING DEVICE USING SAME, AND METHOD FOR MANUFACTURING CONTROL UNIT

CROSS REFERENCE TO RELATED APPLICATIONS

This application is a National Stage of International Application No. PCT/JP2014/071490, filed Aug. 15, 2014, the contents of which are incorporated herein by reference in its entirety.

TECHNICAL FIELD

This invention relates to a control unit which controls driving of a motor, an electric power steering device using same, and a method for manufacturing the control unit.

BACKGROUND ART

A control unit which controls the driving of a motor is provided with a plurality of connectors corresponding to a plurality of sensors and power source systems. More specifically, connectors of a plurality of types are present in accordance with the magnitude of the current flowing the connectors, such as power source connectors and signal connectors, for example. In accordance with such connectors, terminals of a plurality of types are also present.

To give an example of a control unit of this kind, a drive device is known in which a motor and a control unit are integrated coaxially on an output shaft of a motor, a control unit is disposed on the opposite side to the output side of the motor, and furthermore a connector is disposed on the final end of the control unit (see, for example, PTL1).

Furthermore, a power connector, a signal connector and a torque signal connector are provided so as to protrude in an outward radial direction from the motor case, the torque signal connector is separated by a prescribed distance from the power connector, and the connection section with the torque signal line of the torque signal connector is formed so as to face towards the motor in the axial direction of the motor case (see, for example, PTL 2).

CITATION LIST

Patent Literature

[PTL 1] Japanese Patent Application Publication No. 2013-207963
[PTL 2] Japanese Patent Application Publication No. 2012-143036

SUMMARY OF INVENTION

Technical Problem

However, the prior art involves the following problems.
In the drive devices disclosed in PTL 1 and PTL 2, the orientation, type and shape of the connectors varies with the vehicle in which the device is mounted, and therefore, it is necessary to redesign the connector and the periphery thereof, each time, depending on the vehicle.

In other words, in the drive device of PTL 1, changing the type of connector requires changing the shape of the holes provided in the cover, as well as replacing the actual connector, and also necessitates sealing of the cover and the component carrier contained therein. Furthermore, in the drive device of PTL 2, when the direction of the connector is changed in accordance with the vehicle, it is necessary even to redesign the cylindrical part, for example, apart from the connector.

This invention was devised in view of the problems described above, an object thereof being to provide a control unit by which, even if specifications, such as the orientation, type and shape of a connector are changed, it is possible to respond thereto by simply changing the design of a connector portion, and hence the design and manufacture processes can be made efficient.

Solution to Problem

The engine control unit according to this invention is a control unit which controls driving of a motor, wherein the control unit is integrated with the motor coaxially with an output shaft of the motor, and is disposed on an opposite side to an output side of the motor, and moreover is provided with a connector assembly body provided on the opposite side to the output side of the motor, the connector assembly body has: on an end surface on the opposite side to the output side of the motor, a large-current connector of a power supply system, with the large-current connector being disposed in the same direction as the motor output shaft; a small-current connector of a signal system, with the small-current connector being disposed in the same direction as the motor output shaft; and a component mounting section including at least one of a capacitor and a coil, and the large-current connector, the small-current connector and the component mounting section are disposed separately in respective regions.

Advantageous Effects of the Invention

According to the control unit, the connector assembly body includes: on the end surface opposite to the output side of the motor, the large-current connector of the power supply system, with the large-current connector being disposed in the same direction as the motor output shaft; the small-current connector for the signal system, with the small-current connector being disposed in the same direction as the motor output shaft; and the component mounting section including at least one of a capacitor and a coil, and the large-current connector, small-current connector and component mounting section are disposed separately in respective regions.

Therefore, even if the specifications, such as the orientation, type and shape of the connector are changed, it is possible to respond thereto by simply changing the design of a connector portion, and hence the design and manufacture processes can be made efficient.

DESCRIPTION OF EMBODIMENTS

Figure 1:
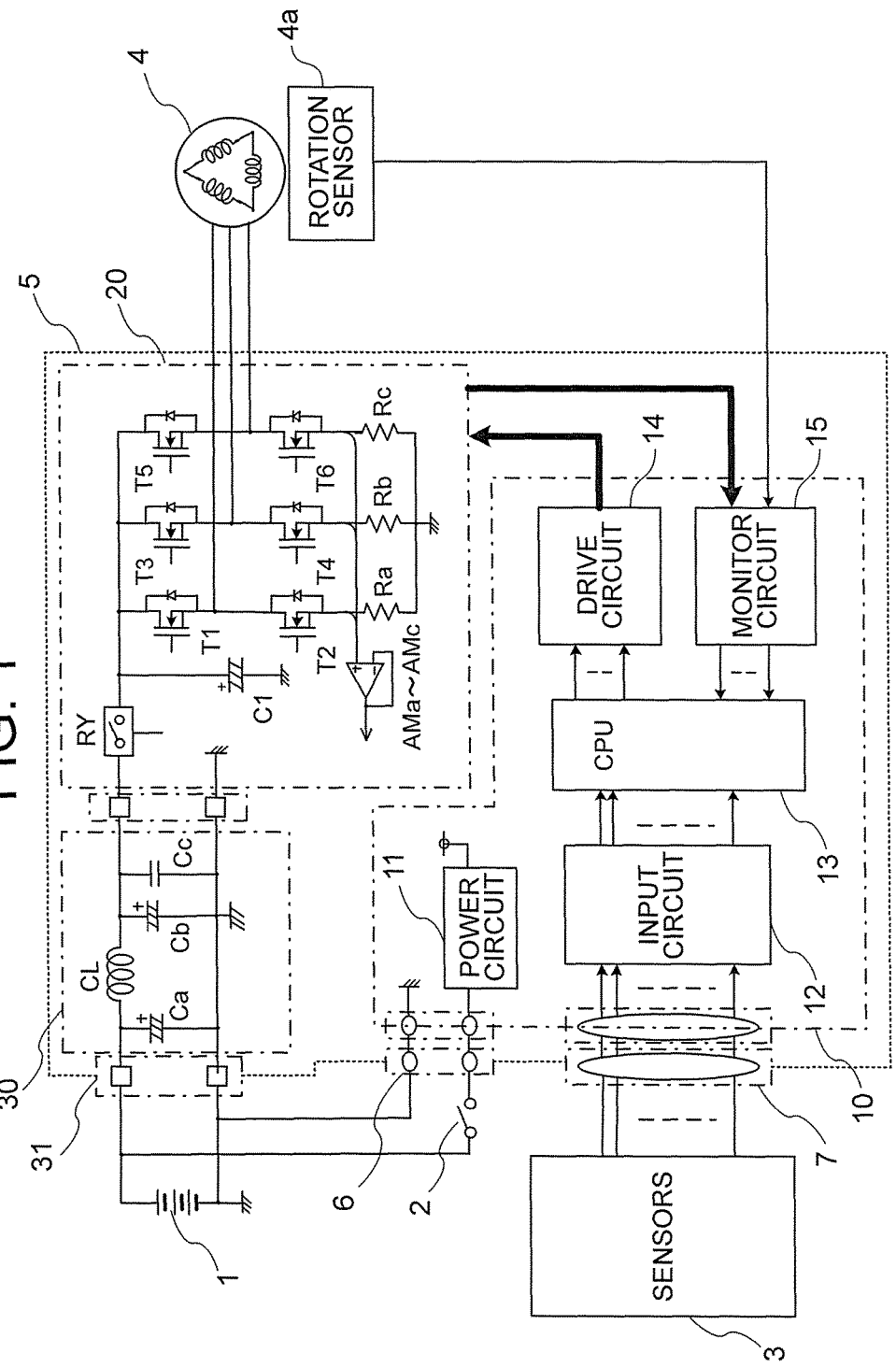
FIG. 1 is a circuit diagram showing the overall circuit configuration of an electric power steering device to which the control unit according to the first embodiment of this invention is applied.

Below, a preferred embodiment of a control unit according to the invention is described with reference to the drawings, and parts which are the same or corresponding are labelled with the same reference numerals in the drawings. The control unit according to this invention is integrated with the motor, coaxially with a motor output shaft, and is disposed on the opposite side to the output side of the motor.

Furthermore, in the description below, a case is described in which the control unit is applied to an electric power steering device, but the invention is not limited to this, and the control unit may be applied to a device other than an electric power steering device, provided that the control unit controls driving of a motor.

First Embodiment

FIG. 1 is a circuit diagram showing the overall circuit configuration of an electric power steering device to which the control unit according to the first embodiment of this invention is applied. In FIG. 1, the electric power steering device is connected to a battery 1 provided on a vehicle side, and to an ignition switch 2 and sensors 3.

Furthermore, the electric power steering device is constituted by a motor 4 and a control unit 5. In this first embodiment, a case is described in which the motor 4 is a three-phase brushless motor, but the invention is not limited to this and may also be a motor with brushes, or a multi-phase winding motor having more than three phases.

A rotation sensor 4a which detects the angle of rotation of a motor output shaft is disposed in the vicinity of an output shaft of the motor 4, and the control unit 5 is disposed on the opposite side to the output of the motor output shaft, coaxially with the motor output shaft.

The control unit 5 is principally constituted by a control substrate 10 on which a CPU 13 is mounted, an inverter circuit 20 which supplies current to the motor 4, a component mounting section 30 on which other relatively large components are mounted and connectors 6, 7, 31. The connectors 6, 7 correspond to low-current connectors, and the connector 31 corresponds to a high-current connector.

The control substrate 10 includes, for example, a 5V fixed power source 11, an input circuit 12 for the sensors 3, a CPU 13 which calculates a control amount, a drive circuit 14 which drives an inverter circuit 20, and a monitor circuit 15 which detects the voltage or current of respective sections in the inverter circuit 20 and also receives output from a rotation sensor 4a.

The inverter circuit 20 includes six switching elements T1-T6 which are provided on a vertical arm in accordance with each phase of the motor 4, which is a three-phase brushless motor, a relay RY which supplies or shuts off a power supply, a capacitor C1 which suppresses control ripples, three shunt resistances Ra-Rc which detect current, and three amplifiers AMa-AMc which convert and amplify the detected current. Here, these components, or a portion thereof, are constituted by components configured as an IC component known as a "Power Module" (PM).

The component mounting section 30 has a coil CL and capacitors Ca, Cb, Cc which suppress noise in relation to the battery power supply system. Here, the components are relatively large in size, and since a broad installation surface area is required for the mounting thereof on the control substrate 10 and/or inverter circuit 20, for example, then it is preferable, in terms of the surface area, to mount these components in separate locations. Furthermore, taking the connections of these components into consideration, it is more effective from the viewpoint of electrical connectivity and suppression of noise, for the components to be situated near the connectors 6, 7, 31. Therefore, these components are disposed separately on the component mounting section 30.

Figure 2:
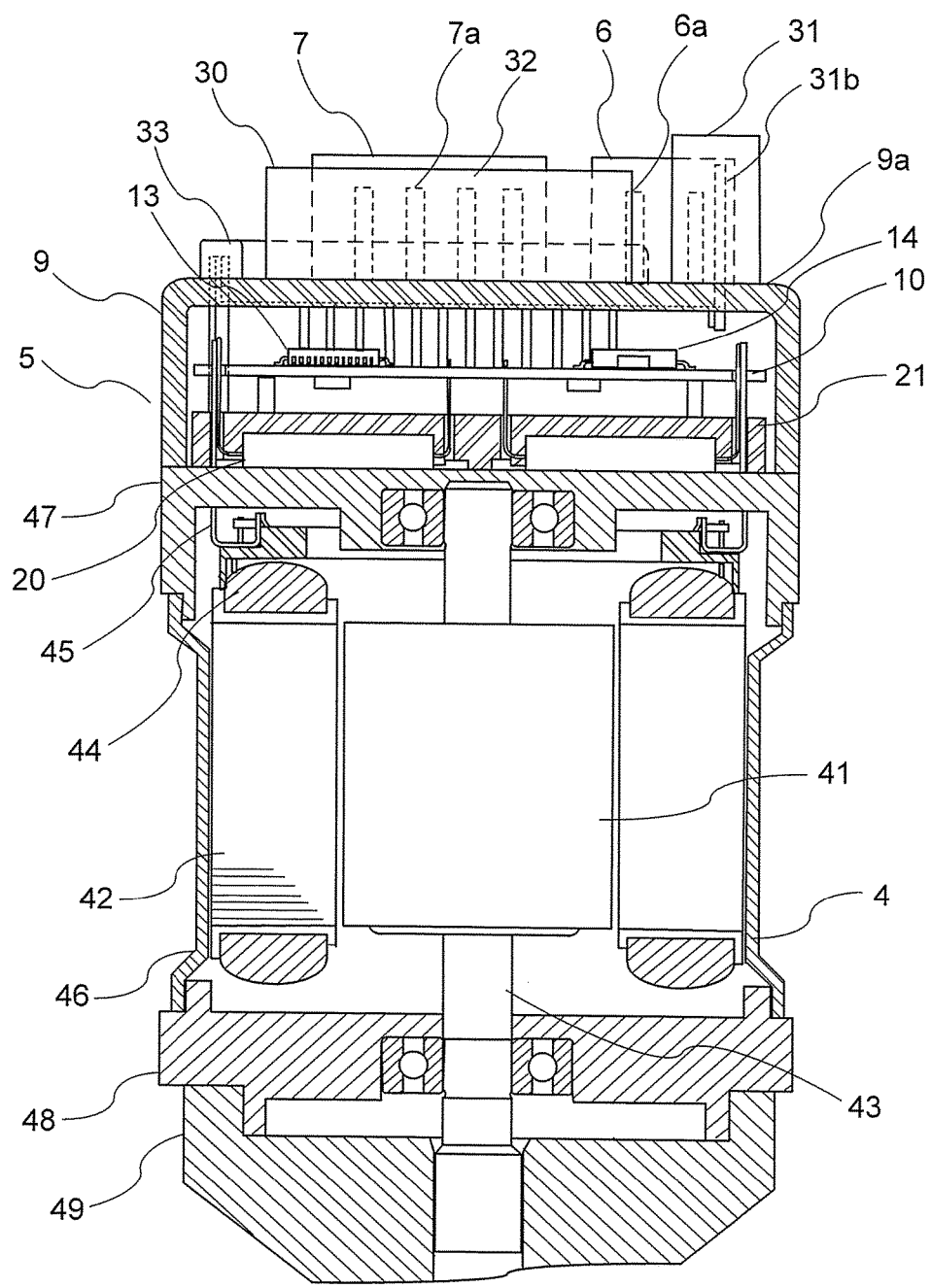
FIG. 2 is a cross-sectional drawing showing an electric power steering device relating to a first embodiment of this invention.

FIG. 2 illustrates the structure of an electric power steering device, in relation to a circuit configuration such as that described above. FIG. 2 is a cross-sectional drawing showing an electric power steering device relating to a first embodiment of this invention. In FIG. 2, the motor 4 is configured by a rotor 41 on which a permanent magnet (not illustrated) is installed about the periphery of a motor output shaft 43, and a stator 42 which is provided about the rotor 41 and about which a three-phase coil 44 is wound, the rotor 41 and the stator 42 being installed inside a yoke 46.

A lower frame 48 and speed reducer 49 are provided in the lower part of the yoke 46, and the rotation of the motor output shaft 43 is transmitted to the speed reducer 49. Here, in FIG. 2, the downward direction in the drawing is the output side and the upward direction is the opposite side to the output side, in other words, the non-output side.

Furthermore, an upper frame 47 is provided in the upper part of the yoke 46 on the non-output side of the motor 4, and three extension coils 45 (only two of which are shown in FIG. 2), extending from the three-phase coil 44 extend upwards through the upper frame 47. Moreover, the portion above the upper frame 47 is the control unit 5, and the control unit 5 is disposed on the opposite side to the output side of the motor 4, coaxially with the motor output shaft 43.

Three PMs which configure an inverter circuit 20 (in FIG. 2, only two are shown) are disposed in close contact with the upper frame 47. Furthermore, one portion of a leg part of the inverter circuit 20 is connected to an extension coil 45, and a further leg part extends upwards.

An intermediate member 21 and a control substrate 10 are layered on top of the inverter circuit 20. A CPU 13 and/or drive circuit 14, etc. is installed on the control substrate 10. Furthermore, a plurality of leg parts from the inverter circuit 20 are connected to the control substrate 10 and the terminals are extended upwards from the control substrate 10.

A connector assembly body 9 is provided on the upper part and outer circumferential part of the control unit 5. The connector assembly body 9 serves to cover the control unit 5, and furthermore the connectors 6, 7, 31 and the component mounting section 30 are disposed on the upper surface 9*a* thereof. The connector assembly body 9 is made from insulating resin, due to the complex shape thereof and the requirement for insulating properties, and in order to integrate with the connector main body.

Furthermore, by arranging the connectors 6, 7, 31 to the inside of the outer diameter of the motor 4 and substantially in the same direction as the motor output shaft 43, the maximum external diameter of the control unit 5 becomes equal to or lower than the outer diameter of the motor 4, and all the plurality of components that constitute the control unit 5 can be accommodated inside the outer diameter of the motor 4.

Figure 3:
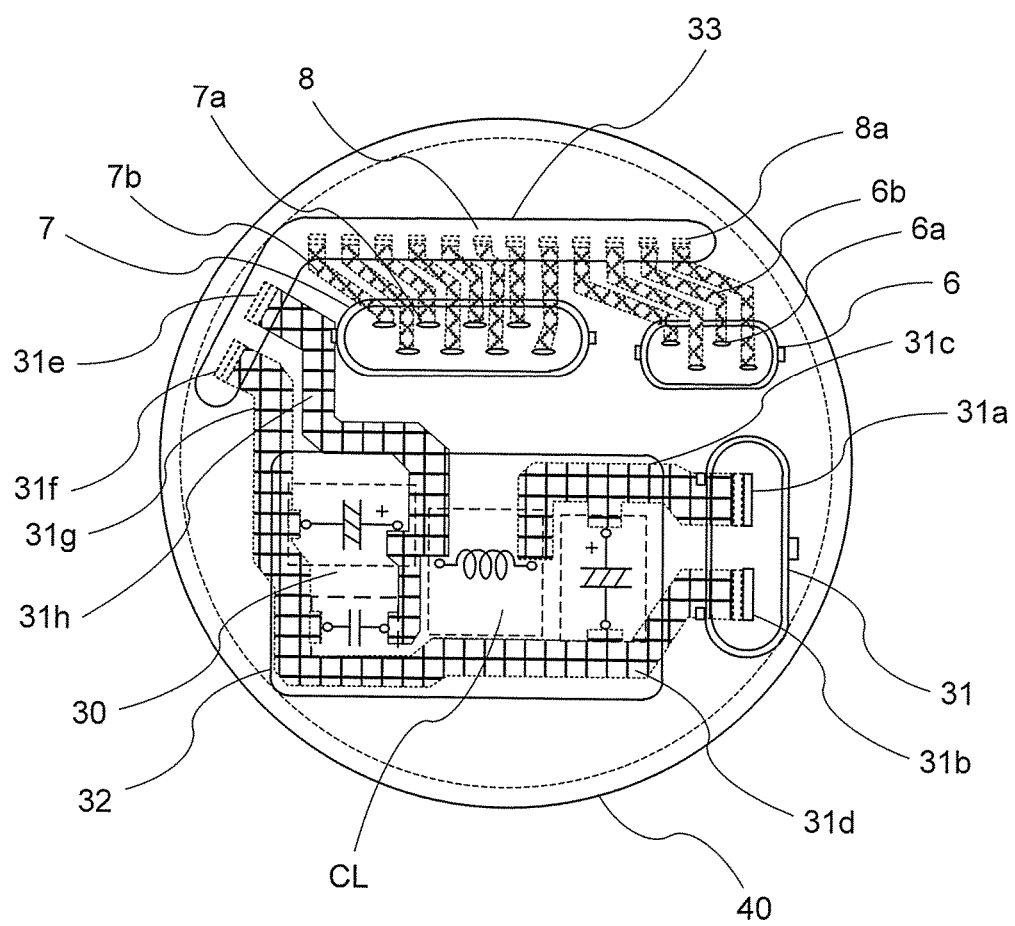
FIG. 3 is a perspective diagram showing the electric power steering device shown in FIG. 2, as viewed from above.

Next, the structure of the connector assembly body 9 is described with reference to FIG. 3, as well as FIG. 2. FIG. 3 is a perspective diagram showing the electric power steering device shown in FIG. 2, as viewed from above. In FIGS. 2 and 3, three connectors, an ignition system connector 6, a sensor system connector 7 and a battery system connector 31 are disposed on the upper surface 9*a* of the connector assembly body 9. Furthermore, a plurality of contact pins 6*a*, 7*a*, 31*a*, 31*b* are arranged on the connectors 6, 7, 31.

In the ignition system connector 6 and the sensor system connector 7, the contact pins 6*a*, 7*a* respectively pass through the upper surface 9*a* of the connector assembly body 9 and are extended as extension terminals 6*b*, 7*b* in the upward direction in FIG. 3. These extension terminals 6*b*, 7*b* correspond to the third extension terminals. Furthermore, the extension terminals 6*b*, 7*b* are gathered near the outer periphery of the connector assembly body 9, and are connected to other terminals 8*a* which extends from the control substrate 10, in a window section 8. This connection section corresponds to the second connection section.

In the battery system connector 31, the contact pins 31*a*, 31*b* are passed through the upper surface 9*a* of the connector assembly body 9 and are connected to the bus bars 31*c*, 31*d*, similarly to the contact pins 6*a*, 7*a*. These bus bars 31*c*, 31*d* extend towards the component mounting section 30 as a power source and ground. These bus bars 31*c*, 31*d* correspond to first extension terminals.

The capacitors Ca, Cb, Cc and the coil CL are mounted on the component mounting section 30 and the leg parts of these, and the bus bars 31*c*, 31*d*, are respectively connected. Furthermore, the bus bars 31*g*, 31*h* extending from these components are extended to the window section 8, and are connected to the power terminals 31*e*, 31*f* which extend to the PM constituting the inverter circuit 20, in the window section 8.

Here, the bus bars 31*g*, 31*h* which extend to the power terminals 31*e*, 31*f* from the component mounting section 30 correspond to second extension terminals, and the connection sections between the bus bars 31*g*, 31*h* and the power terminals 31*e*, 31*f* correspond to first connection sections. The upper part of the window section 8 is covered by the cover 33 and the upper part of the component mounting section 30 is covered by the cover 32, in a similar fashion.

The bus bars 31*c*, 31*d*, 31*g*, 31*h* and the extension terminals 6*b*, 7*b* are formed on the rear side of the upper surface 9*a* of the connector assembly body 9, by insert molding or outsert molding on the connector assembly body 9. In FIG. 3, a state of this kind of the bus bars, terminals and large components, is displayed as a perspective view. In this way, by arranging the component mounting section 30 as well as the connectors 6, 7, 31, inside the outer diameter of the motor 4, it is possible to make efficient use of the region.

When the battery system connector 31 for carrying large current splits and distributes current to a plurality of locations, for the components incorporated inside the control unit 5, then the connector 31 is divided into second external terminals or first connection sections.

Furthermore, the contact pins 6*a*, 7*a*, 31*a*, 31*b*, the bus bars 31*c*, 31*d*, 31*g*, 31*h* and the terminals 6*b*, 7*b*, 8*a*, 31*e*, 31*f* are respectively configured by three components, but a two-component configuration may also be adopted. In this case, it is possible to adopt a two-component configuration, either by incorporating the contact pin 6*a* and the terminal 6*b* into a single body, or by incorporating the terminals 8*a* and the terminals 7*b* into a single body, for example.

Furthermore, the contact pins 6*a*, 7*a*, 31*a*, 31*b* are passed through the upper surface 9*a* of the connector assembly body 9, but it is also possible to abandon the pass-through structure and thus improve waterproofing, by incorporating the extension terminals 6*b*, 7*b* and the bus bars 31*c*, 31*d*, which are connected to the contact pins 6*a*, 7*a*, 31*a*, 31*b*, into a single body.

In this way, although the battery system connector 31 for large current and the ignition system connector 6 and sensor system connector 7 which carry relatively small current are disposed adjacently to each other, the connectors are arranged so as to be dividable into a plurality of regions and gaps are provided between the connectors 6, 7, 31. Furthermore, the component mounting section 30, together with the components installed thereon, is disposed so as to be separated by a gap, rather than severing the connectors 6, 7, 31, and furthermore, the extension terminals 6*b*, 7*b* are also gathered together and disposed in the vicinity of the outer circumference of the connector assembly body 9.

In other words, equivalent components, for example, the connectors 6, 7, 31, are gathered together and disposed independently from the component mounting section and the extension terminals 6*b*, 7*b*, so as not to intersect with the arrangement regions thereof. Therefore, even if the specifications, such as the orientation, type and/or shape of the connectors, varies depending on the vehicle, it is still possible to respond simply by changing the design of the connectors 6, 7, 31 of the connector assembly body 9, and no changes are made to the component mounting section 30 and/or the extension terminals 6*b*, 7*b*.

Furthermore, in FIG. 1, there is only one three-phase motor 4, but a similar configuration can also be used with a set of two or more motors. For example, in the case of a set of two motors, then one further inverter circuit 20 is added. Therefore, two power terminals are required from the battery system connector 31 and the component mounting section 30 onwards.

Here, rather than branching and extending the two sets of power terminals within the control unit 5, it is more efficient to branch same on the upper surface 9*a* of the connector assembly body 9, in the vicinity of the component mounting section 30. In other words, since there is spare room for branching the power terminals on the upper surface 9*a* of the connector assembly body 9, it is possible to obtain an improved effect in terms of noise by branching nearer to the components which suppress noise.

Therefore, only the portion due to the difference of vehicle is changed, and the remaining majority can be used commonly, and therefore it is possible to achieve efficient design, as well as suppressing variation in models. Furthermore, although an arrangement is adopted in which a gap is provided between the connectors 6, 7, 31 and with respect to the component mounting section 30, since the components are gathered and arranged inside each region, then it is possible to achieve a reduction in size.

As described above, according to the first embodiment, the connector assembly body includes, provided on the end surface opposite from the output side of the motor, a large-current connector for the power supply system which is disposed in the same direction as the motor output shaft, a small-current connector for the signal system which is disposed in the same direction as the motor output shaft, and a component mounting section that includes at least one of a capacitor and a coil, and the large-current connector, small-current connector and component mounting section are disposed separately in each respective region.

Therefore, even if the specifications, such as the orientation, type and shape of the connector, are changed, it is possible to respond simply by changing the design of the connector portion, and hence the design and manufacture processes can be made efficient.

In other words, by separating the arrangement regions of each portion, in a connector having a large number of changes, in particular, only the connector portion is changed and there is no need to change the other portions, and therefore it is possible to make the design and manufacture processes efficient.

Second Embodiment

In the second embodiment of this invention, an electric power steering device having a circuit configuration and a connector which differs partially from the first embodiment described above is explained, with reference to the common points and differences between the two embodiments.

Figure 4:
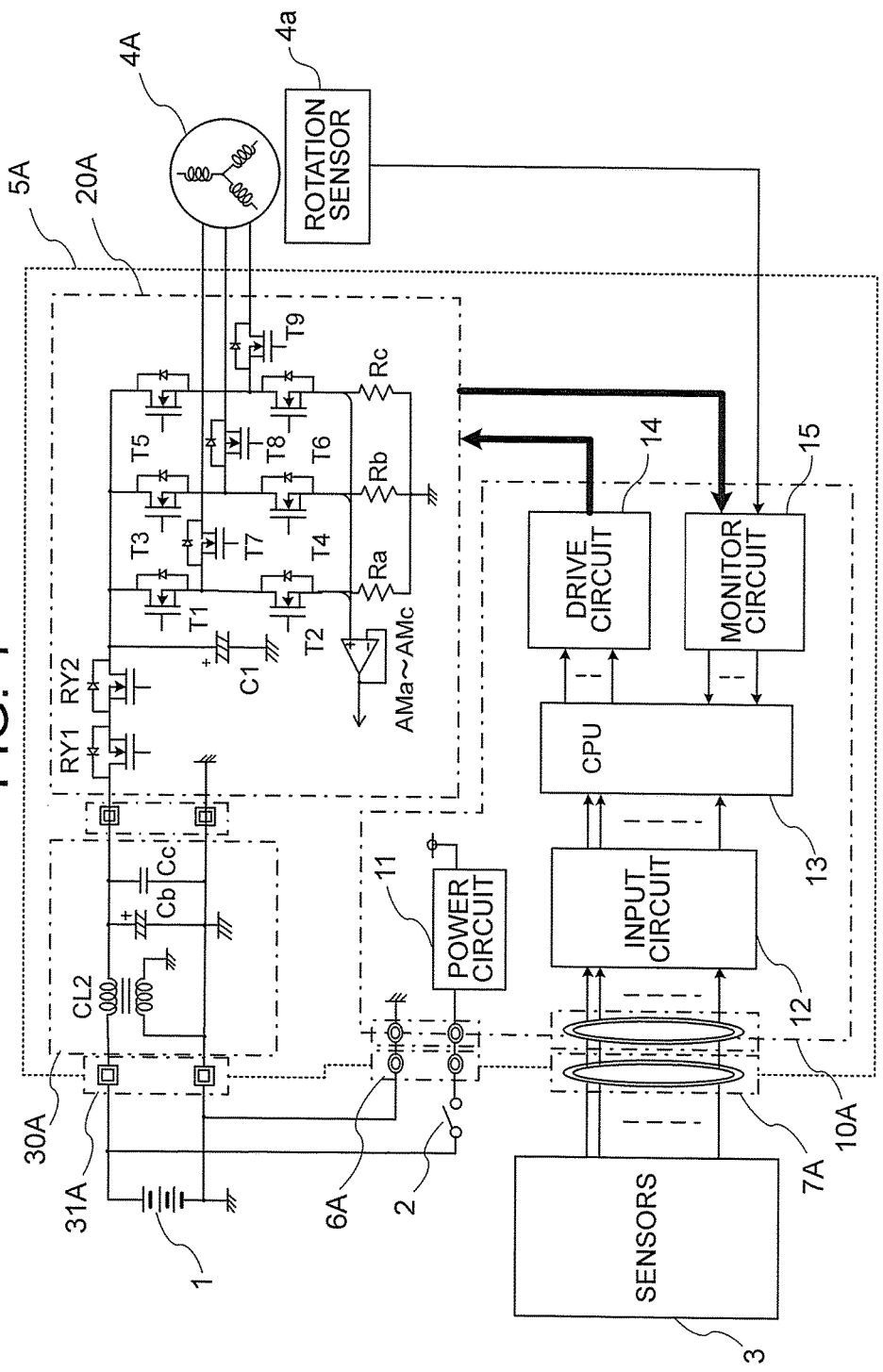
FIG. 4 is a circuit diagram showing the overall circuit configuration of an electric power steering device to which the control unit according to the second embodiment of this invention is applied.
Figure 5:
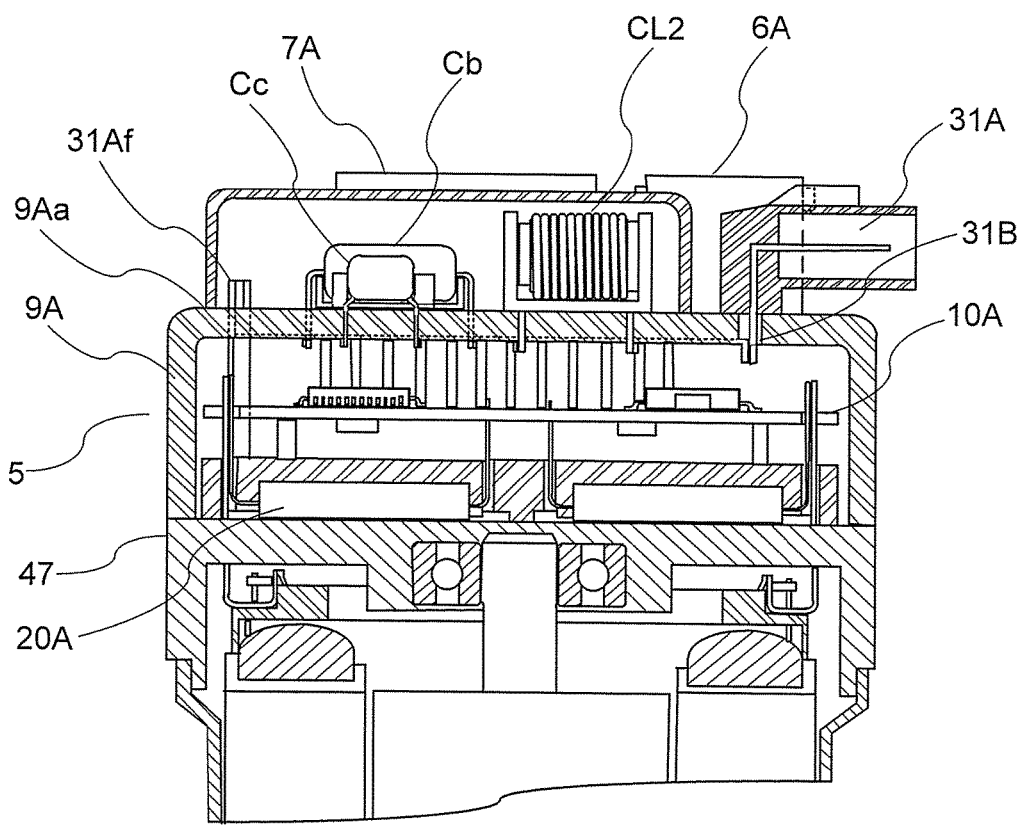
FIG. 5 is a cross-sectional drawing showing an electric power steering device relating to a second embodiment of this invention.
Figure 6:
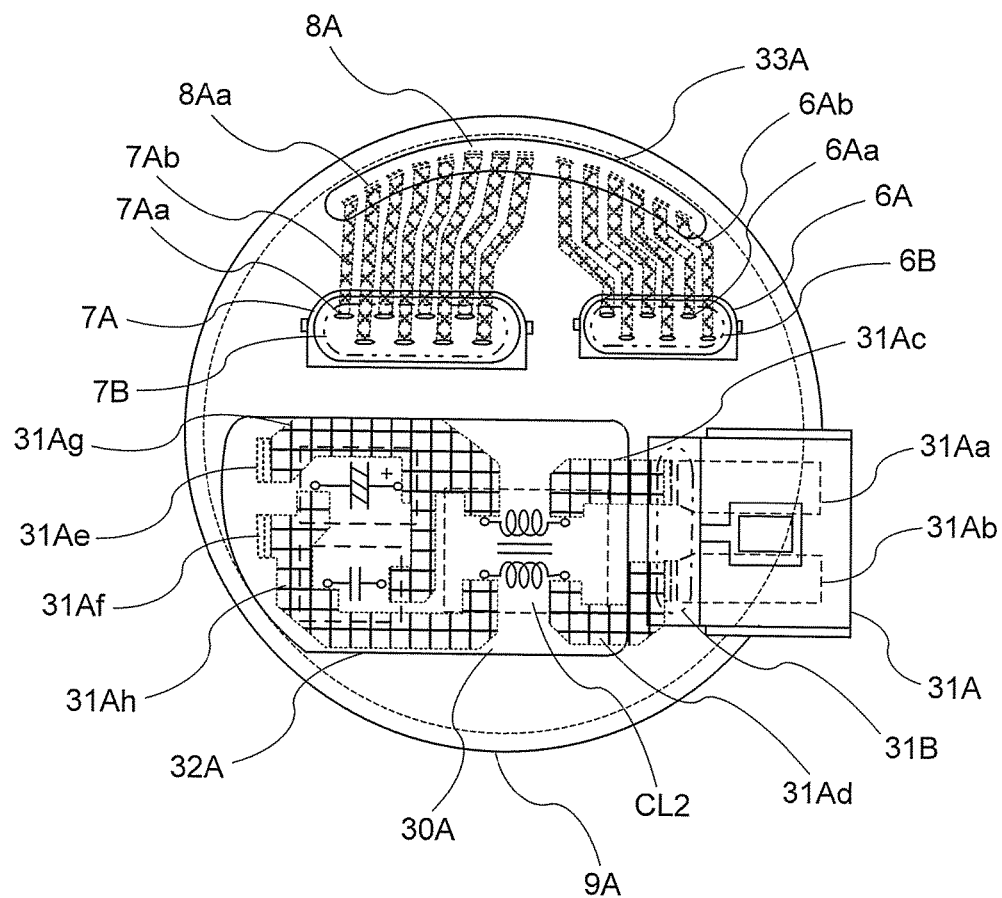
FIG. 6 is a perspective diagram showing the electric power steering device shown in FIG. 5, as viewed from above.

FIG. 4 is a circuit diagram showing the overall circuit configuration of an electric power steering device to which the control unit according to the second embodiment of this invention is applied. Furthermore, FIG. 5 is a cross-sectional drawing showing an electric power steering device relating to a second embodiment of this invention. Furthermore, FIG. 6 is a perspective diagram showing the electric power steering device shown in FIG. 5, as viewed from above.

In FIG. 4, the coil specifications of the motor 4A are changed from a Δ (delta) connection to a Y (stator) connection. Furthermore, the inverter circuit 20A is also changed partially and switching elements T7-T9 are added. These changes are hardly apparent in FIG. 5, and can be handled by changes on the component level.

However, in FIG. 5, the connectors 6A, 7A, 31A are changed from those shown in FIG. 2, and the connector assembly body 9A is required to undergo substantial modifications. The specifications of the connectors are often changed, and instructions are issued by car makers, in accordance with the vehicle and state of installation. Furthermore, the orientation of the connector is often changed depending on the interference and positional relationship with peripheral components of the vehicle. On the other hand, the wiring of the connector harness also changes with variation in the connector, and if the control specifications are also modified, then it also becomes necessary to change the component mounting section 30A, for example.

In circumstances such as these, the extent to which a common configuration can be adopted is a problem in practical design terms. The explanation given below focuses on this point, comparing this embodiment with the first embodiment described above, with reference to FIGS. 5 and 6.

In FIGS. 5 and 6, in particular, the connector 31A is arranged in a substantially perpendicular direction with respect to the motor output shaft 43. Furthermore, the specifications differ in respect of the shape and number of contact pins of the connectors 6A, 7A.

Here, the contact pins 6Aa, 7Aa of the small-current connectors 6A, 7A are respectively extended as extension terminals 6Ab, 7Ab, similarly to the first embodiment, and are gathered in the outer peripheral section of the connector assembly body 9A and connected to extension terminals 8Aa that extend from the control function 10A, in the window section 8A. The upper part of the window section 8A is covered by a cover 33A, similarly to the first embodiment.

On the other hand, the internal component shape and specifications of the component mounting section 30A are different from the first embodiment, but the respective components are arranged in order, according to the circuit configuration, in the empty space adjacent to the large-current connector 31A, and are disposed in a gathered arrangement. Furthermore, the leg parts of these components are connected respectively to the bus bars 31Ac, 31Ad for the power or ground line.

Moreover, the final ends of the bus bars 31Ag, 31Ah extending from the component mounting section 30A are connected to the power terminals 31Ae and 31Af, on the left-hand end in FIG. 6. These components and power terminals 31Ae, 31Af are both covered by the cover 32A. Furthermore, similarly to the first embodiment the bus bars 31Ac, 31Ad are formed on the rear side of the upper surface 9Aa of the connector assembly body 9A, as an insert mold or outsert mold, on the connector assembly body 9A.

In this way, since the large-current connector 31A, the bus bars 31Ac, 31Ad and the component mounting section 30A are arranged in a substantially straight line, and wiring is performed over the nearest distance, then it is possible to obtain a beneficial effect in that only the smallest amount of bus bar member is required. Furthermore, since the bus bars 31Ag, 31Ah to the power terminals 31Ae, 31Af are arranged in a straight line, then in addition to the reduction in the bus bar member, it is also possible to maximize the surface area efficiency.

Moreover, in order to assemble the connectors 6A, 7A and 31A with the connector assembly body 9A, or to mold same integrally therewith, holes 6B, 7B, 31B (the double-dotted lines in the drawing) are provided in the periphery of the contact pins 6Aa, 7Aa, 31Aa, 31Ab of the connectors 6A, 7A, 31A, in order to pass the contact pins 6Aa, 7Aa, 31Aa, 31Ab. These holes 6B, 7B, 31B are virtually the same, even though the connector specifications are modified from those of the first embodiment to those of the second embodiment.

Therefore, it is possible to adopt a common design for the connector assembly body 9A, including the holes 6B, 7B, 31B for the contact pins 6Aa, 7Aa, 31Aa, 31Ab. Furthermore, in the component mounting section 30A also, it is possible to minimize the differences in the arrangement of the bus bars, by arranging in virtually the same positions as in the first embodiment.

Therefore, by determining the arrangement regions of each portion and adopting separate and independent arrangements in which the regions do not intersect with each other, it is possible to achieve a redesign in response to a change in the specifications of the connectors, which minimizes the effects of that change, and hence the design and manufacturing processes can be made efficient.

Third Embodiment

Figure 7:
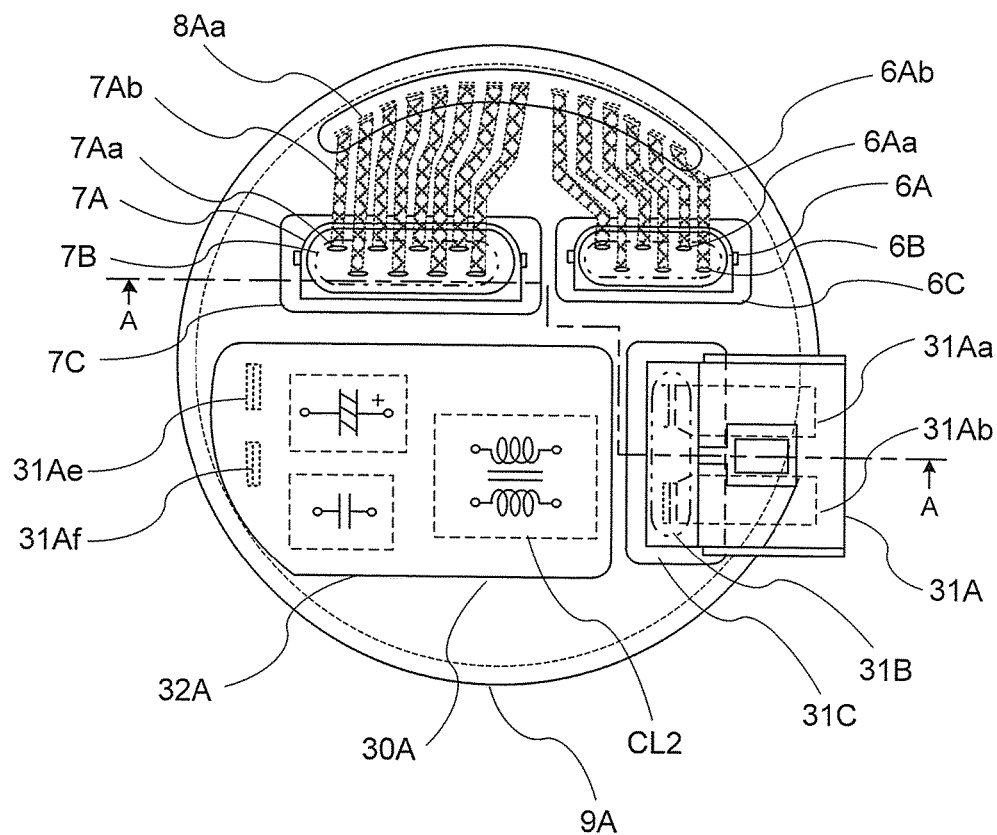
FIG. 7 is a perspective drawing showing an electric power steering device relating to a third embodiment of this invention, as viewed from above.
Figure 8:
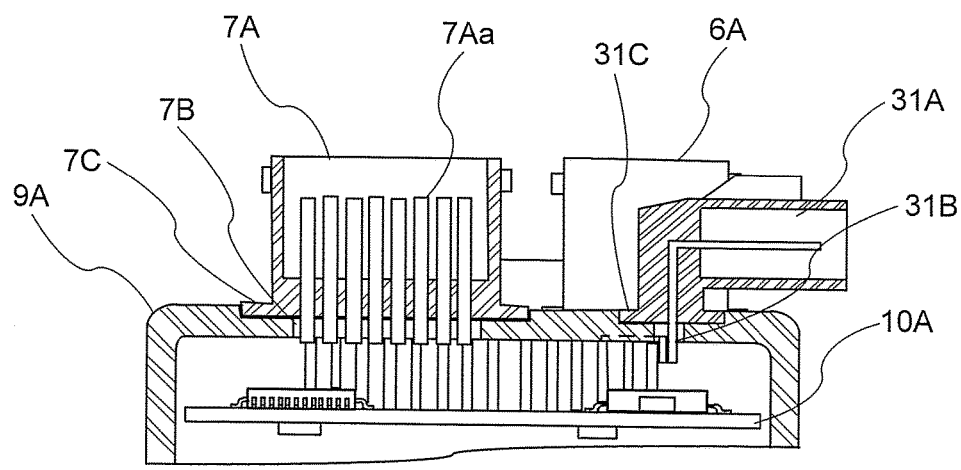
FIG. 8 is a cross-sectional diagram of the electric power steering device shown in FIG. 7, as cut along line A-A, and depicts only the connector assembly body.

FIG. 7 is a perspective drawing showing an electric power steering device relating to a third embodiment of this invention, as viewed from above. Furthermore, FIG. 8 is a cross-sectional diagram of the electric power steering device shown in FIG. 7, as cut along line A-A, and depicts only the connector assembly body. FIG. 7 corresponds to FIG. 6 showing the second embodiment described above.

In FIGS. 7 and 8, the contact pins 6Aa, 7Aa, 31Aa, 31Ab of the connectors 6A, 7A, 31A are the same as the second embodiment, and therefore the connector assembly body 9A and the holes 6B, 7B, 31B are also the same. Here, the connectors 6A, 7A, 31A are shaped so as to be separable from the connector assembly body 9A, and seating surfaces 6C, 7C, 31C are formed in the portions thereof that contact the connector assembly body 9A.

These seating surfaces 6C, 7C, 31C project to the outer peripheral side from the connector main body, as shown in FIGS. 7 and 8. Furthermore, as shown in FIG. 8, a recess is provided in the upper surface 9Aa of the connector assembly body 9A, and the seating surfaces 6C, 7C, 31C are fitted into this recess to form an integrated body. In this case, the seating surfaces 6C, 7C, 31C and the upper surface 9Aa of the connector assembly body 9A may be bonded together by using adhesive.

In this way, by adopting a structure in which seating surfaces 6C, 7C, 31C are formed respectively on the connectors 6A, 7A, 31A, and the seating surfaces 6C, 7C, 31C are fitted into a recess in the upper surface 9Aa of the connector assembly body 9A, then even if there is a change in the specifications of the connectors 6A, 7A, 31A, this will not have any effect on the seating surfaces 6C, 7C, 31C, the portion from the connector assembly body 9A onwards can be configured in a common fashion, and it is possible to respond by replacing only the main body of the connector which requires modification.

There may be cases where the terminals and/or bus bars (not shown in FIG. 7) have to be modified partially, in accordance with change in the specifications of the connectors 6A, 7A, 31A. In this way, if the terminals and/or bus bars are also changed, then it is possible to minimize the modified portion of the connector assembly body 9A, by bonding these terminals and/or bus bars to the rear side of the upper surface 9Aa of the connector assembly body 9A, by outset molding. A replaceable structure of this kind is especially suitable for systems involving many different types, each of a small quantity.

Here, it is envisaged that the connector assembly body 9A is configured by combining the second embodiment and the third embodiment described above. More specifically, in the second embodiment, holes 6B, 7B, 31B are provided in the upper surface 9Aa of the connector assembly body 9A, in the vicinity of the contact pins 6Aa, 7Aa, 31Aa, 31Ab, and in the third embodiment, a recess is provided in the upper surface 9Aa of the connector assembly body 9A. Therefore, it is supposed that a hole which is larger than the actual connector is provided on the upper surface 9Aa of the connector assembly body 9A.

Figure 9:
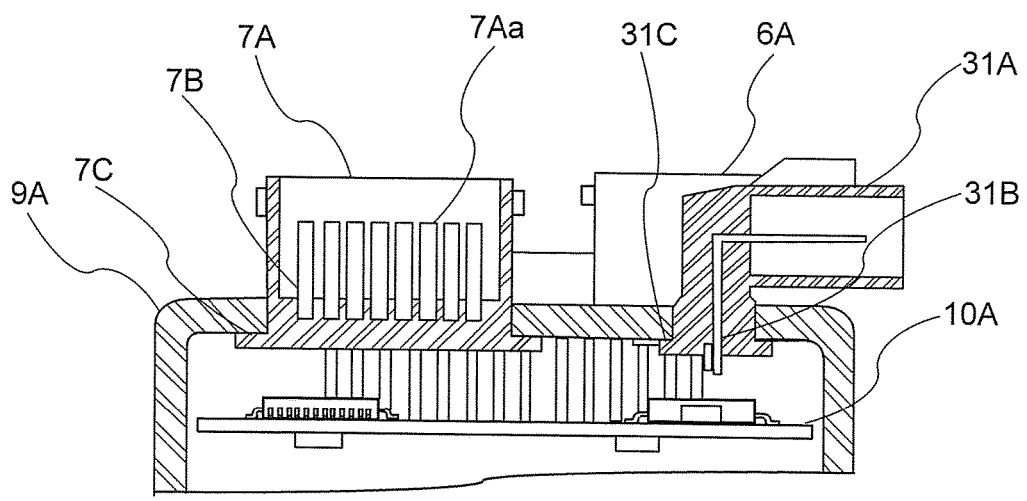
FIG. 9 is a further cross-sectional diagram of the electric power steering device shown in FIG. 7, as cut along line A-A, and depicts only the connector assembly body.

FIG. 9 is a further cross-sectional diagram of the electric power steering device shown in FIG. 7, as cut along line A-A, and depicts only the connector assembly body. In FIG. 9, a hole which is larger than the actual connector is provided in the upper surface 9Aa of the connector assembly body 9A.

By adopting this hole, a connector which has few contact pins can be inserted into the hole and therefore it is possible to respond to change in the specifications of the connector. Furthermore, the connectors 6A, 7A, 31A each have seating surfaces 6C, 7C, 31C formed thereon, and therefore by introducing the connector from the rear side of the connector assembly body 9A and covering the hole with the seating surfaces 6C, 7C, 31C, it is possible to respond to modifications in the specifications of the connector.

Consequently, by the configuration described above, in order to minimize the effects of modification of the specifications of the connectors, the arrangement regions of each portion are separated and are arranged so as not to intersect with other regions, and therefore it is possible to share the use of components, as well as being able to minimize the regions to be redesigned as a result of modification of the specifications of the connectors.

Fourth Embodiment

In this fourth embodiment of the invention, a method for responding to modification of the specifications of the connector, during actual manufacture, will be described. Firstly, the connector assembly body is often manufactured from a resin molding, by taking the complexity of the shape, insulating properties and waterproofing properties, etc. thereof into account. More specifically, as shown in FIGS. 2, 5, 8 and 9, a connector having a complex shape is arranged on the upper surface of the connector assembly body. Therefore, the die used for molding the connector assembly body is configured from multiple portions.

Consequently, it is not possible to extract the whole of the connector assembly body from the die, with the desired shape, simply by moving two portions of die respectively upwards and downwards, or leftwards and rightwards. Therefore, it is necessary to use a plurality of dies in the manufacture of the connector assembly body. Accordingly, the configuration of the plurality of dies is split into a large die (large die) which forms the overall outer shape, and comparatively small dies (small dies) which only surround the connectors, and by combining this plurality of dies, it is possible to achieve a die configuration for completing the connector assembly body.

In this way, by splitting into small dies for each connector, it is possible to respond to connectors having a relatively large number of specification modifications, and efficiency in design and manufacturing can be achieved. Furthermore, since the connectors themselves have a complex shape, involving the retaining mechanism, insertion of contact pins, etc., then it is also easier to manufacture the dies in a split fashion. Desirably, dies are manufactured separately for the connector periphery and the component mounting section, and a die is then configured by combining these dies.

Furthermore, it is also possible to envisage mounting of a connector having the largest outer shape, taking the currently expected types and sizes of connector into consideration, and to manufacture the respective dies by splitting into a region larger than this outer shape. Therefore, since it is possible to respond to a connector having the largest outer shape, then a sufficient response will be possible for connectors having a smaller outer shape than this. Furthermore, since the regions between the connectors and the component mounting sections are divided, then it is possible to configure the spaces therebetween as the mating surfaces of the respective dies.

Consequently, since a die configuration is adopted in which the die for molding the connector assembly body is divided and a plurality of dies are combined, then it is easy to respond by modifying and replacing only a comparatively small die at the periphery of the connector, and therefore a design and manufacturing response can be achieved easily.

The invention claimed is:

1. A control unit which controls driving of a motor,
wherein the control unit is integrated with the motor coaxially with an output shaft of the motor, and is disposed on an opposite side to an output side of the motor, and moreover is provided with a connector assembly body provided on the opposite side to the output side of the motor,
the connector assembly body has: on an end surface of the connector assembly body in an axial direction of the output shaft and on the opposite side to the output side of the motor,
a large-current connector of a power supply system, with the large-current connector being disposed in the same direction as the motor output shaft;
a small-current connector of a signal system, with the small-current connector being disposed in the same direction as the motor output shaft;
a component mounting section including at least one of a capacitor and a coil; and
a first extension terminal which extends from the small-current connector, and
the large-current connector, the small-current connector and the component mounting section are disposed separately in respective regions, wherein
an arrangement region of the first extension terminal on the end surface of the connector assembly body is different from the respective regions of the large-current connector, the small-current connector and the component mounting section.

2. The control unit according to claim 1, wherein the end surface of the connector assembly body on the opposite side to the output side of the motor is divided broadly into two regions, which are a region for the large-current connector and the component mounting section, and a region for the small-current connector.

3. An electric power steering control device, configured from the control unit and the motor according to claim 1, wherein a steering assistance torque is generated by the motor.

4. The control unit according to claim 2, further comprising: a second extension terminal which electrically connects the large-current connector and a component on the component mounting section; and a third extension terminal which extends further from the component on the component mounting section,
wherein the first extension terminal, the second extension terminal and the third extension terminal are arranged separately from one another.

5. The control unit according to claim 4, further comprising:
a first connection section which electrically connects the third extension terminal and an interior of the control unit; and
a second connection section which electrically connects the first extension terminal and the interior of the control unit, wherein the first connection section and the second connection section, and the first extension terminal, the second extension terminal the third extension terminal are each arranged separately on a plane.

6. The control unit according to claim 4, wherein the large-current connector, the second extension terminal and the component mounting section are arranged in a linear fashion along the end surface of the connector assembly body.

7. The control unit according to claim 4, wherein, when the large-current connector is divided and wired to a plurality of locations for components installed in the control unit, the large-current connector is divided on the third extension terminal or a first connection section.

8. The control unit according to claim 4, wherein
the large-current connector and the small-current connector have seating surfaces respectively, each projecting to an outer circumferential side from the connector;
the connector assembly body has a recess for introducing the seating surface and a hole for passing a contact pin of the connector, or a hole for introducing a main body of the connector, from which the seating surface is excluded; and
the end surface of the connector assembly body on the opposite side to the output side of the motor, and the seating surface, are integrated in close contact with each other.

9. The control unit according to claim 5, wherein at least one of the first connection section and the second connection section is disposed on a peripheral portion of an end face of the connector assembly body, on the side opposite to the output side of the motor.

10. A method for manufacturing a control unit which controls driving of the motor, the control unit being integrated with the motor coaxially with an output shaft of the motor, and being disposed on an opposite side to an output side of the motor, and moreover being provided with a connector assembly body provided on the opposite side to the output side of the motor, the connector assembly body having: on an end surface of the connector assembly body in an axial direction of the output shaft and on the opposite side to the output side of the motor, a large-current connector of a power supply system, with the large-current connector being disposed in the same direction as the motor output shaft; a small-current connector of a signal system, with the small-current connector being disposed in the same direction as the motor output shaft; and a component mounting section including at least one of a capacitor and a coil, the large-current connector, the small-current connector and the component mounting section being disposed separately in respective regions,
the method including: a step for forming an outer shape of the connector assembly body by using a large die; and
a step for forming at least one of the large-current connector and the small-current connector, by using a small die,
wherein the connector assembly body further includes an extension terminal which extends from the small-current connector, and wherein an arrangement region of the extension terminal on the end surface of the connector assembly body is different from the respective regions of the large-current connector, the small-current connector and the component mounting section.

* * * * *